United States Patent [19]
Yu

[11] Patent Number: 5,343,240
[45] Date of Patent: Aug. 30, 1994

[54] BIDIRECTIONAL VIDEO TELEPHONY USING SHARED CHANNELS ON COAXIAL CABLE NETWORKS

[75] Inventor: Cheng D. Yu, Scotch Plains, N.J.

[73] Assignee: AT&T Bell Laboratories, Murray Hill, N.J.

[21] Appl. No.: 787,436

[22] Filed: Nov. 4, 1991

[51] Int. Cl.[5] ...................... H04N 7/14; H04M 11/00
[52] U.S. Cl. ..................................... 348/14; 455/3.1; 455/6.3
[58] Field of Search ................................. 358/84–86, 358/142, 143; 379/53, 54, 93–98, 90, 110, 105; 455/3.1, 3.2, 5.1, 6.1–6.3, 7; 348/14–17, 6, 10, 12, 13, 22, 24

[56] References Cited

U.S. PATENT DOCUMENTS

| | | | |
|---|---|---|---|
| 4,386,365 | 5/1983 | Gargini | 358/85 |
| 4,654,866 | 3/1987 | Böttle et al. | 379/54 |
| 4,686,667 | 8/1987 | Ohnsorge . | |
| 4,847,829 | 7/1989 | Tompkins et al. . | |
| 4,893,326 | 1/1990 | Duran et al. | 358/85 |
| 4,901,367 | 2/1990 | Nicholson . | |
| 5,027,426 | 6/1991 | Chiocca, Jr. | 358/85 |
| 5,138,649 | 8/1992 | Krisbergh et al. | 358/85 |

OTHER PUBLICATIONS

"Home Terminals and Collision-Free Approaches to Two-Way Services", Pieter den Toonder, Proceedings of International Conference on Satellite & CATV, May 1983 Conference, pp. 405–416.

"CATV" Masayoshi Sugita, et al., National Technical Report, vol. 32, No. 3, Jun. 1986, pp. 99–107.

"Two-Way Cable System Using Residential CATV Facilities-NCTA Referred", Semir Sirazi, et al., IEEE International Conference on Consumer Electronics, Jun. 1984, pp. 224–225.

"Development of an Optical/Coaxial Hybrid CATV System", Kazuo Murayama et al., Sumitomo Electric Technical Review, No. 29, Jan. 1990, pp. 137–145.

"First Results from Life Operation of the Biarritz Broadband Multiservice Network", Philippe Touyarot, et al., Internatonal Switching Symposium, 1987 Proceedings, Mar. 17, 1987, vol. 2, pp. 0229–0233.

"An Emerging Service", P. Barnes, Electronic Technology, vol. 20, Mar. 1986, pp. 280–281.

"Interactive Services in French Videocommunication Networks", H. Seguin, et al., Globecom Tokyo 1987, pp. 2000–2004.

Primary Examiner—Wing F. Chan
Attorney, Agent, or Firm—Barry H. Freedman

[57] ABSTRACT

A system and method for providing two-way video telephony between an originating location and a destination location, each equipped with an audio/video display (television) and an audio/video source (camera) using available channels dedicated for video telephony on one or more coaxial cable distribution networks which can be part of existing cable television systems. Each location is equipped with a network interface unit (NIU) which modulates outgoing audio/video information (which can be in analog or digital form) together with outgoing control messages onto an attached coaxial cable network. The NIU also demodulates incoming audio/video information and incoming control messages received from the attached coaxial network. Upstream signals may be transmitted to a cable network head end and then to the head end serving the destination location using demodulators, A/D converters (if not already in digital form), multiplexers, and the switched digital telecommunications network. If an intra-cable system call is involved, certain processing steps may be eliminated. Users of the system contend for available channels on the cable distribution network, and channel assignments are made on a per call basis, only for the duration of the call.

44 Claims, 7 Drawing Sheets

BIDIRECTIONAL VIDEO TELEPHONY USING SHARED CHANNELS ON COAXIAL CABLE NETWORKS

FIELD OF THE INVENTION

This invention relates generally to video telephony, and, more specifically, to bidirectional transmission of voice and picture information among a large number of geographically distributed users. Our invention contemplates sharing on an availability basis, of channels on a coaxial cable network such as is currently provided by cable television systems. The switched digital telephone network may be used for interconnection between users on several cable networks.

BACKGROUND OF THE INVENTION

Because two-way video communications can give telephone users the added ability to communicate graphical information and to see facial expressions and gestures that cannot be conveyed by audio alone, much emphasis has been placed on commercial development of such systems. For example, at the 1963 World's Fair in New York City, AT&T demonstrated a prototype of its Picturephone video telephone system, by which panics at remote locations could see and speak with each other. Unfortunately, the Picturephone system was too costly, and its picture quality was not good enough for commercial deployment at that time. In recent years, video telephones that work with analog telephone lines have been demonstrated. However, due to the limited bandwidth (~3 KHz) of conventional telephone lines, and the consequent limitation on the amount of audio and video information that can be carried through the analog telephone network, commercial development has again been limited, such that most products in this category offer the ability to see only limited motion (a few black- and-white frames per minute) on a relatively small display with poor resolution.

In order to overcome the bandwidth limitation associated with video telephony transmitted over the analog telephone access network, video telephones more recently have been designed to work with digital telephone access networks, such as ISDN. However, at the present time, digital access facilities to consumer homes are not readily available.

Still other video telephone systems have been designed to overcome the access, bandwidth and cost problems, but each suffers some drawbacks. For example, many systems are point to point, connecting, for example, individual classrooms in a campus environment or video-teleconference rooms in a corporate environment Thus, users in off-net locations cannot be served. Some other systems provide local video telephone service to only a small group of users. For example, in U.S. Pat. No. 4,847,829 issued to E. Neil Tompkins et al. on Jul. 11, 1989, analog video terminals are connected to a centrally located analog video switch via dedicated coaxial cables in a star configuration. The number of users is limited by the capacity of the video switch. This approach is also not economical for serving a mass consumer market because each video terminal requires a dedicated coaxial cable to access the video switch.

U.S. Pat. 4,901,367 issued to Victor Nicholson on Feb. 13, 1990, describes a coaxial cable network operating at 800 MHz that is shared by sixty (60) users, each assigned a dedicated 12 MHz bandwidth. However, the patented system does not provide for communication with other stations not connected to the same coaxial cable, and indeed, sharing by only sixty users is still not economical enough.

U.S. Pat. 4,686,667 issued to Horst Ohnsorge on Aug. 11, 1987, describes an all-digital broadband subscriber loop system that uses a high-speed digital central switch fed by multiple optical fiber links, each operating at 1.12 Gb/s. The 1.12 Gb/s bandwidth is divided into sixteen 70 mb/s channels which are then carried by dedicated coaxial cables to subscribers' premises in a star configuration. The drawback of this system is that each subscriber has to incur the heavy cost of a video codec to digitize audio and video signals, the cost for multiple levels of digital multiplexing, and the cost of dedicated co-axial cable for access.

Other systems use optical fiber to directly link to subscriber homes in order to obtain the high bandwidth needed for full motion video. However, these facilities are expensive, and thus are not accessible to the ordinary household. Besides, it will take decades to reach ubiquity.

In recent years, a number of developments have converged that could make video telephony readily available to a large number of users at a relatively reasonable cost. The present invention takes advantage of these developments. Specifically, in 1990, an international video compression standard (CCITT H.261) became available which describes digitization and compression of analog video signals at rates which are multiples of 64 Kb/s (i.e., $1 \times 64$ Kb/s to $30 \times 64$ Kb/s ). These codecs will be widely available, and if they can be shared by multiple users, the per user cost will be readily affordable. With respect to interconnecting video telephone signals among geographically distant locations, a switched digital telephone network capable of providing capacity in multiples of 64 Kb/s is now available from interexchange carriers such as AT&T. With respect to distribution of video telephone signals to video telephone subscribers, the cable TV industry deployed coaxial distribution networks to about 90 percent of all U.S. households. Since cable networks in general carry some 20 to 80 downstream channels, the cost of dedicating several downstream channels for video telephony in a cable network is relatively inexpensive, because these channels can be shared by a large number of households. In the coaxial network, the 5–30 MHz bandwidth is typically reserved for upstream channels (from the subscriber premises to "head end" apparatus maintained by the cable provider) that currently have little usage, either for passive pay-per-view messages or for local program generation. These upstream channels can be used to transmit upstream video telephone traffic. Besides, the cable TV industry also has a well-publicized evolution plan to deploy fiber trunks to bring high quality signals from the head end to hubs for local distribution. When this happens, head end equipment will be duplicated for each new hub, thereby subdividing a large cable network into multiple smaller networks, each operating an "independent" distribution network. This approach will reduce the number of households sharing the coaxial cable distribution network associated with one fiber hub area. Thus, the upstream and downstream channels dedicated to video telephony in a particular cable network can be shared by a manageably small group of users.

With respect to origination and termination equipment, 12 million camcorders have already been sold in the U.S., and the growth rate is projected to be 20 percent annually. These camcorders can be used as origination equipment for video telephony. Termination equipment can be an ordinary television set. At the user premises, only inexpensive network interface equipment is required to access the coaxial cable facility.

SUMMARY OF THE INVENTION

In accordance with the present invention, two-way video telephony is provided between an originating location and a destination location, each equipped with an audio/video display (television) and an audio/video source (camera) using video telephone channels on one or more coaxial cable distribution networks which can be part of existing cable television systems. Some originating and destination locations may be equipped with digital video coding and/or decoding equipment, which is arranged to convert the NTSC signals output from the video camera to digital form, and to convert received digital signals back to NTSC form for display on a television. This "special" type of arrangement will be described after describing the "typical" arrangement for those subscribers who do not have digital coding/decoding equipment in their locations.

In the 37 typical" arrangement, each originating and destination location is equipped with a novel analog network interface unit (NIU) which modulates outgoing analog audio/video information together with outgoing control messages onto an attached coaxial cable network. The NIU also demodulates incoming analog audio/video information and incoming control messages received from the attached coaxial network.

When a caller wishes to establish a two way video telephone call from the originating location to the destination location, the originating NIU sends the originating location address and the destination location address to a video control center (VCC) which is described in more detail below. If available channels exist in both the originating and destination cable distribution networks, the VCC locks in a pair of downstream and upstream channels in both networks for the duration of the call. The originating NIU modulates the analog audio and video output in NTSC format from the video camera to the assigned upstream video telephone channel using a carrier frequency that is associated only with that channel. The modulated signal, typically having a 6 MHz bandwidth, is transmitted to an originating side head end via the coaxial cable and reverse amplifiers in common with signals from several other users that are modulated to different portions of the upstream coaxial bandwidth.

The originating side head end includes analog and digital head ends that are either co-located or located at different locations and interconnected via cable or other analog transmission facility. In the analog head end, the video telephone channels contemplated by the present invention are separated from the entertainment channels. In the digital head end, the audio and video information is recovered via demodulation from the modulated signal carded on the coaxial cable, and the control signals are also demodulated and recovered. If desired, echo cancellation can be applied to the audio signal to remove unwanted echo noise.

For embodiments of the present invention in which a digital switching network is interposed in the communications path between the originating head end and the destination head end, a codec in the originating digital head end is then used to convert the audio and video information from analog to compressed digital form, so that it may be multiplexed with other similar signals from other subscribers and transmitted as a composite signal to the digital switching network, which may be located in the nearest point of presence (POP) provided by a long distance carrier. At the POP, the composite digital signal is demultiplexed to retrieve each individual digital signal. Based upon routing information derived from the VCC, each individual digital signal is routed to the appropriate destination digital head end that serves the destination location. There, the received digital signal is transformed from digital to analog form using a codec complementary to the codec in the originating head end, and applied to the destination analog head end.

In the destination analog head end, the analog signal is used to modulate a carrier signal appropriate for the assigned downstream channel. This signal is applied to the coaxial cable serving the destination location, in common with other modulated signals at different frequencies which are destined for other parties having different assigned channels. Since the same cable network serves both video telephone users as well as cable TV subscribers, it is necessary to control access to specific portions of the coaxial cable bandwidth (i.e. specific channels) among these users. For this purpose, the video control center is arranged to send an authorization signal which is also modulated onto the downstream data channel and applied to the coaxial cable. Each NIU in the system is arranged to have its own identity or address. Thus, even though the analog signal is received at all network interface units served by the cable, the analog audio and video signal can be further processed only by the specific called party NIU addressed by the head end. This NIU is authorized to demodulate the specific downstream channel assigned to it to retrieve the incoming analog audio and video signals and apply them to a conventional television at the destination location.

In the "reverse" direction (i.e., from the destination location to the originating location), the NIU at the destination location is also authorized to modulate the analog audio and video output in NTSC format from the video camera to an upstream video telephone channel assigned by the VCC. Following the same procedure as described above for the "forward" direction, the analog signal is digitized in the destination head end and sent to the originating side head end. There, it is converted back to analog form and modulated onto a reserved downstream video telephone channel in the calling party's cable distribution network. The calling party's NIU is authorized to demodulate the incoming analog audio and video signals sent from the called party and display the NTSC signal on his/her television.

The video control center (VCC) mentioned above contains translation tables, from which necessary routing information can be derived from the destination number entered by a user. The VCC communicates with the digital head ends serving the originating location and the destination location specified by the caller.

By virtue of the arrangement contemplated by the present invention, compression equipment advantageously need only be located in the digital portion of each head end, and thus is shared among multiple users, making the arrangement more economical for all users who do not have video coding and/or decoding equipment. Also, a dedicated access facility is not required for each user, since a single two-way coaxial cable can be shared by hundreds or thousands of users, and the downstream and upstream video telephone channels can be shared by the users on a competition or contention basis. Also, channels are allocated such that a user is assigned particular channels only for the duration of his/her video telephone call. This is superior to previous arrangements, in which a dedicated cable or a fixed portion of the cable bandwidth is allocated to each one of a small user group. Also, the present invention allows for graceful transition from coaxial to fiber optic facilities: fiber trunks can be deployed between multiple cable concentration points and the cable head end office.

The network interface unit contemplated by the present invention receives outgoing analog video telephone signals, in standard NTSC format, from a video camera or a video camcorder for transmission to the cable system,, and delivers analog video telephone signals incoming from the cable system, in standard NTSC format, to a TV set. This unit also provides upstream and downstream access control to the video telephone channels on the coaxial cable.

Two data communication channels (one upstream, one downstream) are provided on the coaxial cable for signaling, control and maintenance purposes. The downstream data channel carries polling messages which solicit call initiation requests from users; channel assignment codes to allocate particular channels for the calling and the called parties; authorization codes to activate descrambling circuitry in the calling and the called party's NIUs; and other control and maintenance messages. The upstream data channel is reserved for a polled user for a short period of time to carry responding messages and dialing digits generated by the calling party. If both the originating location and the destination location are on a coaxial cable served by the same head end, the analog video telephone information received from an upstream channel may be connected directly to a downstream video telephone channel in the digital head end via a "crossbar" switch located within the head end itself.

For "special" originating and destination locations equipped with digital video encoding and/or decoding equipment, several modifications are made to the "typical" arrangement just described.

Specifically, in the originating location, a digital NIU is provided which includes digital video coding and/or video decoding equipment. The digital video coding equipment digitizes and compresses the analog audio and video output in NTSC format from the video camera into a digitally encoded bit stream.

When a caller equipped with video coding and decoding equipment wishes to establish a two-way video telephone call to a destination location, the originating digital NIU sends the origination and destination location addresses to the VCC in the same way as described above in the "typical" arrangement. If digital upstream and downstream channels are available, the originating digital NIU modulates the digitally encoded audio and video information onto the assigned digital upstream video telephone channel, using a carder frequency that is associated only with that channel. Note that the phrase "digital upstream video telephone channel" used here refers to a channel on the cable distribution network that is adapted to convey digitally encoded video telephone information by modulating a carrier signal with a digital signal that represents such digital information. The cable distribution network, however, retains its essentially analog characteristics. The modulated signal, typically having a fraction of 6 MHz bandwidth (e.g. 1.5 MHz) is transmitted to an originating side head end via the coaxial cable in common with other digital and analog video telephone upstream channels.

In the analog head end, the digital upstream video telephone channel is separated from the entertainment channels and other video telephone channels. Note that, even for "special" locations using digital processing, a portion of the head end is considered an analog head end, because the cable distribution network is essentially an analog transmission medium even when digital signals are used to modulate an analog carder signal. In the digital head end, the digitally encoded audio/video information is recovered via demodulation from the assigned carrier frequency that is associated with the digital upstream video telephone channel.

For embodiments of the present invention in which a digital switching network is interposed in the communication path between the originating head end and the destination head end, the digitally encoded audio/video information is multiplexer with other digitized signals from other subscribers and transmitted as a composite digital signal to the digital switching network as described above in the "typical" arrangement. This digital signal is routed to the appropriate destination head end that serves the destination location, the same way as described in the "typical" arrangement. There, the received digital signal is digitally scrambled and modulated to an assigned digital downstream video telephone channel, if the destination location is equipped with digital video decoding equipment. On the other hand, the received digital signal is first transformed from digital to analog form using a video decoder and then scrambled and modulated to an assigned analog downstream video telephone channel, if the destination location is not equipped with digital video decoding equipment.

If the destination location is equipped with video decoding equipment, the assigned digital downstream video telephone channel is transmitted to the destination location via the coaxial cable, in common with other modulated analog and digital downstream channels. A destination digital NIU is arranged to permit demodulation of only the specific assigned downstream digital video telephone channel. This allows the destination location to retrieve the incoming digitally encoded video/audio information, digitally descramble the bit stream, and transform the digital signal back to NTSC form using a video decoder, for display on a television.

If both the originating location and the destination location are on a coaxial cable served by the same head end, and both of them are equipped with digital video coding and decoding equipment, the digital upstream video telephone channel may be connected directly to a digital downstream video telephone channel in the digital head end via the "crossbar" switch described in the "typical" arrangement.

BRIEF DESCRIPTION OF THE DRAWINGS

The present invention will be more fully appreciated by consideration of the following detailed description, when read in light of the accompanying drawing in which.

DETAILED DESCRIPTION

Figure 1:
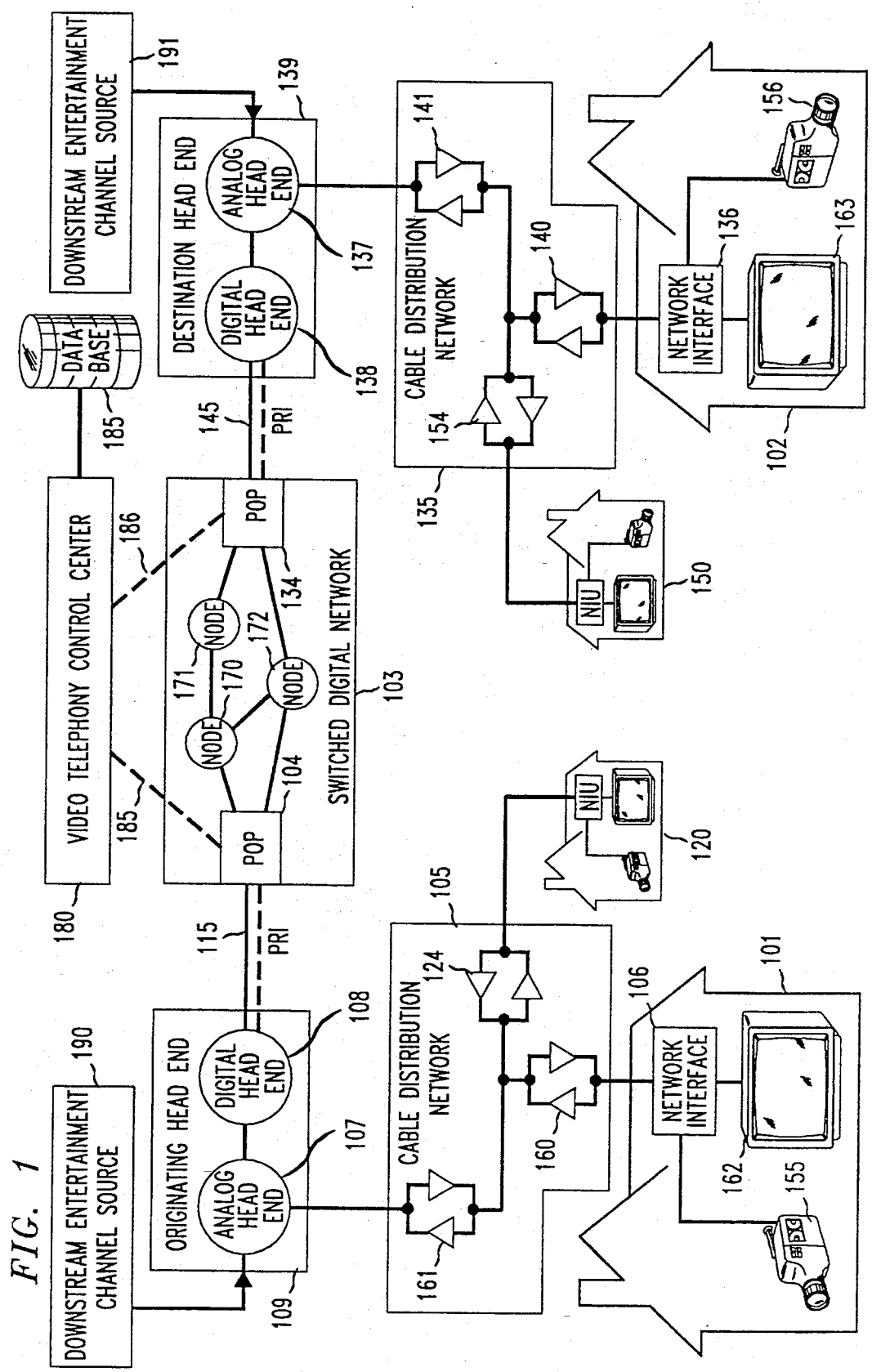
FIG. 1 is a diagram illustrating one embodiment of our system for providing two-way audio and video communication via coaxial cable networks connected by at least one digital switch in a switched digital telephone network.

Referring first to FIG. 1, there is shown a block diagram illustrating one embodiment of our system for providing two-way audio and video communication over coaxial cable networks connected by at least one digital switch in a switched digital telephone network. In FIG. 1, an originating location 101 is shown connected to a destination location 102 via a switched digital telecommunications network 103, such as AT&T's switched digital network. The gateways to network 103 are point of presence (POP) locations 104,134, which are described in more detail below.

Audio and video communication between a network interface unit (NIU) 106 (described in more detail in connection with FIG. 2 or FIG. 8) positioned within originating location 101 and analog head end 107 (described in more detail in connection with FIG. 3) uses coaxial cable distribution network 105, which includes a series of bidirectional (i.e., forward and reverse direction) amplifiers such as amplifiers 160,161. Such amplifiers are currently available in three bandwidth split categories from sources such as Scientific Atlanta, Jerrold and Magnavox. Analog head end 107 filters the received signal so that only the portion of RF bandwidth that is dedicated to video telephone is demodulated and applied to a digital head end 108 within originating head end 109. The portion of the RF bandwidth that is used for "entertainment channels" is modulated by existing head end equipment and applied to existing cable system facilities that form no part of the present invention. As illustrated in FIG. 1, other locations such as location 120 are tied into coaxial cable distribution network 105 in a tributary type structure, via additional bidirectional amplifiers such as amplifier 124. Note that all locations, both those shown and others not shown, receive the same signals that are in effect "broadcast" on coaxial network 105.

Typically, the RF spectrum between 5 MHz and 30 MHz on cable network 105 is reserved for upstream use. Accordingly, four 6 MHz channels can simultaneously carry upstream analog audio and video signals in NTSC format. However, the coaxial bandwidth can be split in other ways for upstream and downstream use, so that a different number of upstream channels may be available for either upstream video telephone signals or entertainment signals. For example, digital video compression technology has made possible packing several (e.g. 2 to 5) NTSC signals in one 6 MHz bandwidth. One such system, known as the DigiCable system, is available from General Instrument Corporation. Throughout this specification, analog video telephone channels will be assumed to have a 6 MHz bandwidth, while digital video telephone channels will be assumed to require a bandwidth that is a fraction of 6 MHz, e.g., 1.5 MHz.

In digital head end 108, the demodulated audio and video signal is converted to a compressed digital signal, multiplexed with other digital signals, and sent to POP 104 as a composite signal via a digital communications channel 115, such as a T1 or T3 digital communications link using an ISDN primary rate interface (PRI) signaling protocol. The composite digital signal is then demultiplexed and one digital signal is transported from POP 104 to POP 134 via the digital switched telephone network, which may be AT&T's switched 384 Kb/s network.

As the signal continues toward the destination location, many of the processing steps just described are performed again. Thus, the digital signal received in POP 134 is multiplexed with other digital signals destined to the same destination cable network and the composite signal is transmitted to destination head end 139 via a digital communication channel 145, such as a T1 or T3 digital communications link using an ISDN PRI signaling protocol. In a similar fashion to that just described, audio and video communication between head end 139 and destination location 102 uses the coaxial cable distribution network 135 serving destination location 102, which connects the analog head end 137 within destination head end 139 to a network interface unit (NIU) 136 positioned within destination location 102, via a series of bidirectional amplifiers such as amplifiers 140, 141. Digital head end 138, which is connected to POP 134 via a digital communications channel 145, such as an ISDN primary rate interface (PRI) circuit, transforms digital signals back to analog audio and video signals, which are then modulated to specific RF carriers allocated for video telephone. As illustrated in FIG. 1, other locations such as location 150 are tied into coaxial cable distribution network 135 in a tributary type structure, via additional bidirectional amplifiers such as amplifier 154. Thus, signals on cable distribution network 135 can represent video telephone information concurrently originating in or destined for several locations, as well as "entertainment channel" information combined in analog head end 137 that is destined for existing cable system facilities 135. As with originating head end 109, the analog and digital head ends 137, 138 within destination head end 139 can be physically located at the same or different locations.

Within originating location 101 and destination location 102, audio and video signals are originated by a camera 155 or 156, respectively, and received and displayed on a conventional television 162 or 163, respectively. These elements are connected to and interact with NIU 106 and 136, respectively, in a manner to be explained more fully below. It will be understood that any audio/video origination source (such as a camcorder or video tape player) can be used instead of cameras 155, 156 and that any utilization device (such as a VCR) can be used instead of televisions 162, 163.

Figure 6:
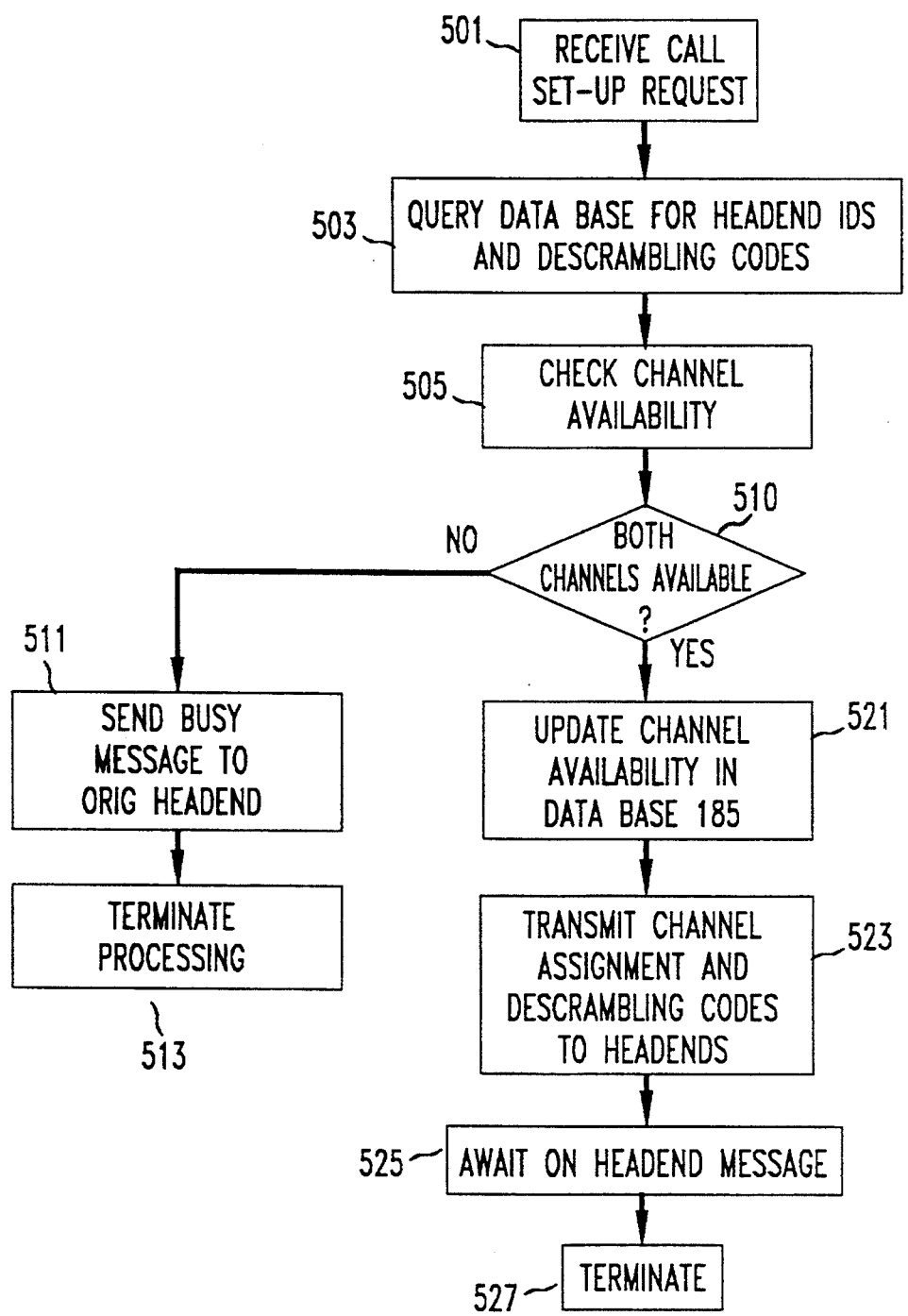
FIG. 6 is a flow diagram illustrating the process followed in video telephone control center 180 of FIG. 1 in setting up a video telephone call.

Switched digital network 103, as shown in FIG. 1, may include a single switch or a plurality of switches including switches within POP 104 and 134 as well as other switches shown as "nodes" 170–172 in FIG. 1. The switches are interconnected by suitable transmission and signaling facilities that are themselves well-known and form no part of the present invention. Suffice it to say that the digital network is arranged to route calls, which can be digitally encoded to represent audio and video information as well as associated routing and control signals, to the appropriate destination. For the purposes of controlling network call flow, a video control center 180 (VCC), having an associated database 185, explained in more detail in conjunction with FIG. 6, is provided. VCC 180 is connected to the switches in network 103 including POPs 104 and 105, via signaling lines 185, 186 shown as dashed lines, and to any other switches and POPs in network 103 that can be used to route video telephone traffic in connection with the present invention.

Before proceeding with a detailed description of the components of the system shown in FIG. 1, an overview of the steps involved in originating a call from originating location 101 will be instructive. To begin a bidirectional voice/video call, a user pushes a START button on NIU 106 (or on a remote control device which sends signals to NIU 106) which initiates a request signal that is equivalent to an off-hook message used in conventional telephone to indicate a desire to originate a video telephone call. This off-hook message is sent to digital head end 108 when NIU 106 is polled thereby. As explained in more detail in conjunction with FIG. 3, digital head end 108 includes a processor 360 (preferably a fault-tolerant mini computer) and an associated database 361 which contains identity codes for the NIUs that are attached to cable distribution network 105 and also keeps track of the upstream and downstream channel status on that network. A polling data communication protocol is implemented between processor 360 and all of the NIUs connected to network 105, such that processor 360 polls each NIU sequentially. If no upstream video telephone channel is available on the coaxial cable distribution network 105 connecting NIU 106 to digital head end 108, a one-bit flag in the polling message is set to zero. This bit is used by NIU 106 to activate a local busy tone generator if the start button is activated during this period. If, on other hand, a video telephone channel is available, the flag is set to one. In this case, the NIU is directed to transmit the called party's video telephone number along with information identifying the originating NIU, to processor 360, which packages it into an ISDN-PRI signaling message that is sent to VCC 180.

At VCC 180, the called and calling party information obtained from digital head end 108 is used to access a database 185 to retrieve further information concerning the call, such as the destination head end ID, the video telephone channel availability status on cable distribution network 135, the corresponding descrambling codes for each of the NIUs (e.g. 106, 136) involved in the call, and any other user profile information useful for processing the call. If the called party has no video telephone channel available, (i.e., if cable distribution network 135, which simultaneously supports a predetermined number of video telephone channels, is at its capacity) VCC 180 sends a BUSY message back to digital head end 108 and thence through a downstream data communication channel within cable distribution network 105 to the NIU 106. If, on the other hand, the called party has a video telephone channel available on cable network 135, VCC 180 updates the channel availability status stored in database 185 to "reserve" channels on both networks 105 and 135 for present use. VCC 180 also sends downstream and upstream channel assignment codes to both the originating head end 109 and the destination head end 139, to actually assign the reserved upstream and downstream channels in both coaxial distribution networks 105 and 135 to the present call. These channel assignments are in turn communicated to NIUs 106 and 136. VCC 180 also instructs digital head end 108 to set up a digital circuit (e.g. 64 Kb/s, 128 Kb/s, 384 Kb/s, or up to 1.5 Mb/s) to digital head end 138 on switched digital network 103, and to send descrambling codes to both NIU 106 and 136 of the calling and called parties, respectively.

The destination NIU 136, upon receiving the upstream and downstream channel assignment and the descrambling codes, activates a ringer to inform the called party of an incoming video telephone call. After the called party pushes a START button (equivalent to "off-hook" in telephony), the incoming audio/video signals are fed to the called party's television and the called party's camera sends its audio/video signals through the assigned upstream channel to the calling party's television.

After two-way communication has been established between locations 101 and 102, either location can terminate the call by activating an END button at NIU 106 or 136, or at a remote control device which communicates with the NIUs. The END signal is transmitted in the upstream data communication channel to the attached head end (109 or 139), and interpreted in a manner equivalent to an on-hook signal in telephony, namely to instruct switched digital network 103 to terminate the video telephone call. A termination message is also sent to VCC 180 to relinquish the previously reserved channels in cable distribution networks 105 and 135.

Figure 2:
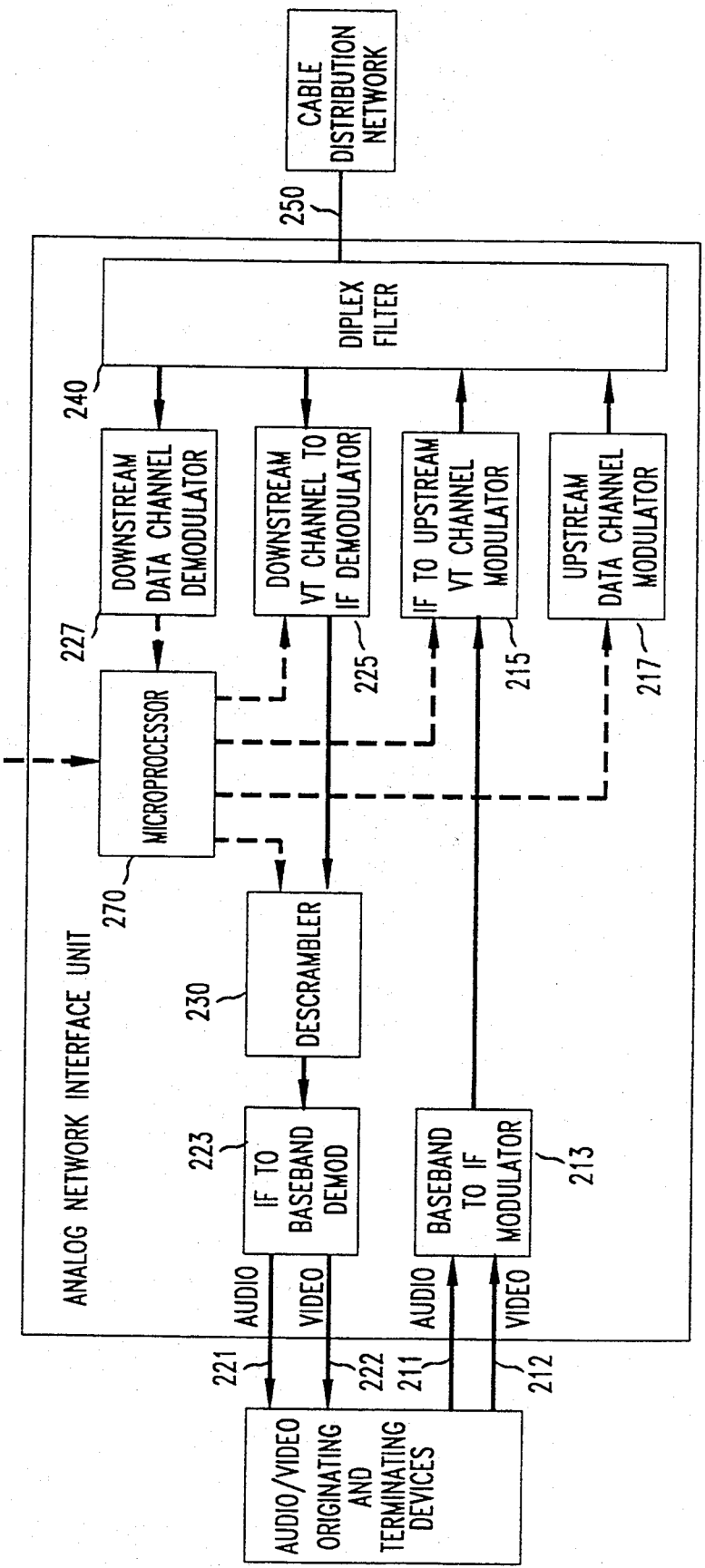
FIG. 2 is a block diagram of an analog network interface unit (such as NIU 106 or 136 in FIG. 1) arranged in accordance with the present invention.
Figure 7:
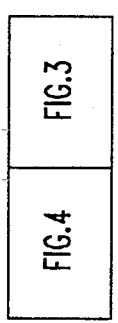
FIG. 7 shows the inter-relationship between FIG. 3 and FIG. 4.

Referring now to FIG. 2, there is illustrated in block diagram form an analog network interface unit (such as NIU 106 or 136 in FIG. 1) arranged in accordance with the present invention. This NIU is used in "typical" embodiments of the present invention, in which digital coding and decoding is not available in originating and destination locations. In this embodiment audio and video signals generated in an originating location are provided to the NIU on individual inputs 211 and 212, respectively, while audio and video signals are output from the NIU on individual outputs 221 and 222, respectively. The NIU is connected to a cable distribution network through a coaxial cable 250, for the purpose of sending and receiving frequency modulated signals, typically in the 5–550 MHz frequency band, via a diplex filter 240, which operates much like a conventional hybrid found in a telephone receiver. The functions of filter 240 are: (1) to provide a high-frequency band pass (e.g. 50 to 550 MHz) between coaxial cable 250 and the downstream data channel demodulator 227 as well as the downstream video telephone channel to IF demodulator 225; (2) to provide a low-frequency band pass between coaxial cable 250 and the upstream data channel modulator 217 as well as the IF to upstream video telephone channel modulator 215. This capability exists in most two-way coaxial cable amplifiers. Within the NIU, a microprocessor 270 receives information from dialing pad 272 and from downstream data channel demodulator 227, which demodulates the downstream data communication carrier frequency to retrieve control information sent from digital head end 108 and VCC 180. The downstream control information may include the following messages: (1) polling message; (2) upstream video telephone channel assignment message; (3) downstream video telephone channel assignment message; and (4) descrambling authorization message.

Video telephone signals generated in the originating location and destined for the terminating location are processed in the NIU by modulating a carrier to form an RF signal illustratively having an approximate 6 MHz bandwidth. This is done so that several (illustratively four) upstream video telephone "channels" will exist on coaxial cable 250. Of course, other arrangements may utilize fewer or additional channels. Modulation is accomplished in two stages, first to an intermediate (IF) frequency in baseband to IF modulator 213, and then to the desired channel frequency in IF to upstream video telephone channel modulator 215. The particular channel center frequency selected and used in modulator 215 is under the control of a microprocessor 270, through its interpretation of the upstream video telephone channel assignment message generated by VCC 180.

Incoming video telephone signals are processed in the NIU of FIG. 2 by tuning (frequency demodulating) the RF signal received on coaxial cable 250 to recover the embedded audio and video information. Demodulation is accomplished in two stages, first by a downstream video telephone channel to IF demodulator 225 and then by an intermediate frequency to baseband demodulator 223. The particular channel center frequency used in demodulator 225 is selected under the control of microprocessor 270 through its interpretation of the downstream video telephone channel assignment message generated by VCC 180. In order to assure that only the desired party can receive and utilize the incoming audio/video information, the downstream signal is scrambled (in scramblers 371–373 in the destination side digital head end, as explained more fully in FIG. 4). Descrambler 230 is arranged to descramble the scrambled IF signal output from demodulator 225, under the control of microprocessor 270 through its interpretation of the descrambling authorization message generated by VCC 180.

Microprocessor 270 also receives inputs from the user of the NIU of FIG. 2, illustratively via keypad 272, in order to obtain information about each video telephone call, such as on-hook and off-hook status, dialed number, billing information, authorization number, and so on. This information is applied to a separate upstream data channel modulator 217, which converts the digital data to a frequency modulated signal that is also transmitted via coaxial cable 250.

Before describing the remaining portions of the present invention, it will be instructive to describe here the arrangement of a digital NIU used in "special" embodiments in which digital encoding and/or decoding is available in either an originating location, a destination location, or both. Such a digital NIU is illustrated in block diagram form in FIG. 8. In this figure, as in FIG. 2, analog audio and video signals generated in an originating location are provided to the NIU on individual inputs 211 and 212, respectively, while analog audio and video signals are output from the NIU on individual outputs 221 and 222, respectively. As in FIG. 2, the digital NIU of FIG. 8 is connected to a cable distribution network through a coaxial cable 250, for the purpose of sending and receiving frequency modulated signals, typically in the 5–550 MHz frequency band, via diplex filter 240.

Figure 8:
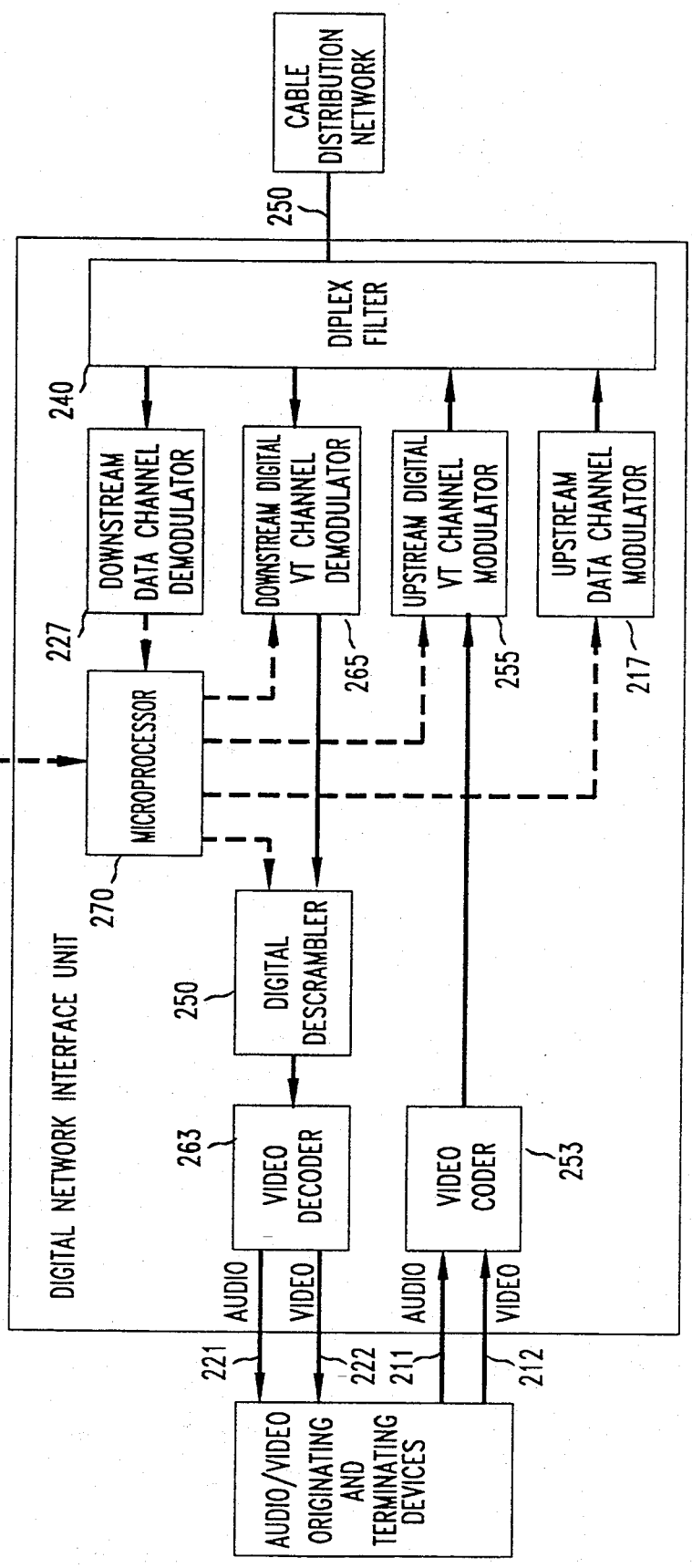
FIG. 8 is a block diagram of a digital network interface unit such as NIU 106 or 136 in FIG. 1.

The NIU of FIG. 8, like its counterpart in FIG. 2, includes a microprocessor 270 which receives information from dialing pad 272 and from downstream data channel demodulator 227 and which demodulates the downstream data communication carrier frequency to retrieve control information sent from digital head end 108 and VCC 180. The analog video/audio signals coming from inputs 211 and 212 are first digitally encoded in video coder 253 to form a digital bit stream, which is then modulated in an upstream video telephone channel modulator 255 onto an assigned digital upstream video telephone channel using a carrier frequency that is associated only with that channel. The particular channel center frequency selected and used in modulator 255 is under the control of microprocessor 270, through its interpretation of the upstream video telephone channel assignment message generated by VCC 180. Note that two-step modulation (baseband to IF, and IF to channel frequency) is not required in this embodiment.

With respect to downstream signals, incoming digitally encoded video telephone signals are retrieved in the digital NIU of FIG. 8 by demodulating the specific downstream digital video telephone channel in downstream video telephone channel demodulator 265. The particular channel center frequency used in demodulator 265 is selected under the control of microprocessor 270 through its interpretation of the downstream digital video telephone channel assignment message generated by VCC 180. In order to assure that only the desired party can receive and utilize the incoming digital audio/video information, the downstream signal is scrambled (in digital scrambler 37 1 in the destination side digital head end, as explained more fully in FIG. 4). Digital descrambler 250 is arranged to descramble the scrambled digital signal output from demodulator 265, under the control of microprocessor 270 through its interpretation of the descrambling authorization message generated by VCC 180. The output of descrambler 250 is applied to video decoder 263 which converts the digital signal to audio/video signals in the appropriate format (e.g. NTSC format) for application to the terminating devices, e.g., a television or monitor. Note that two step demodulation (i.e. from video telephone channel to IF and from IF to baseband) is not required in this embodiment.

Figure 3:
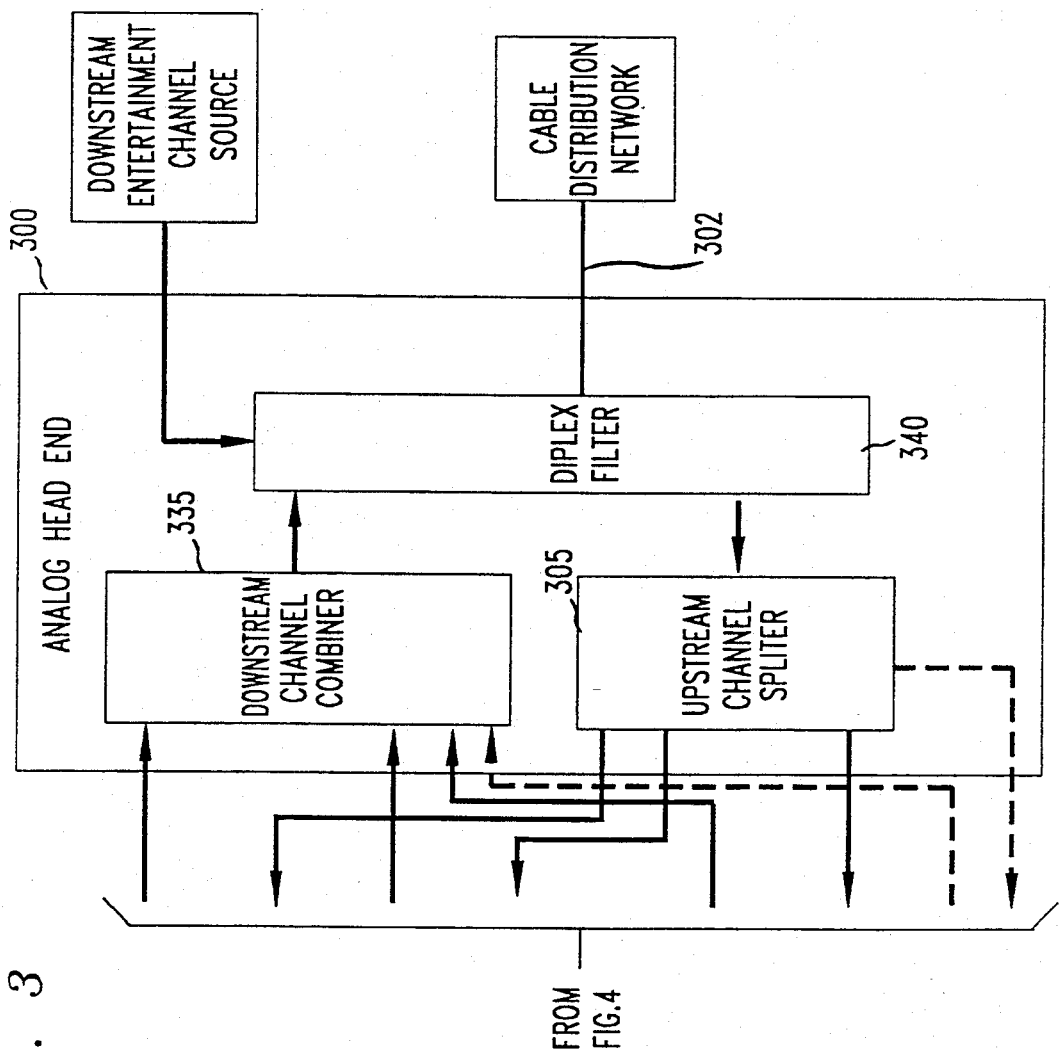
FIG. 3 illustrates, in block diagram form, a typical arrangement for an analog head end, such as head end 107 or 137 of FIG. 1.

FIG. 3 illustrates, in block diagram form, a typical arrangement for analog head ends, such as head ends 107 and 137 of FIG. 1. The function of an analog head end is, in general, to act as signal converter and channel combiner and splitter for the coaxial bandwidth of a cable distribution network.

More specifically, as shown in FIG. 3, an analog head end 300 is arranged to receive RF signals from coaxial cable 302 via a diplex filter 340 similar to filter 240 of FIG. 2, or FIG. 8 which acts like a hybrid and separates incoming and outgoing signal streams, and separates video telephone channel signal streams from entertainment channel signal streams. Signals in the upstream video telephone bandwidth, e.g. 5–30 MHz, are applied to upstream channel splitter 305, which filters and separates the incoming signals on the basis of carrier frequency, and applies the individually modulated RF signals to a plurality of demodulators 307–309, each having the appropriate carrier frequency.

Downstream video telephone signals output from downstream video telephone channel modulators 327–329 in the digital portion of the head end are combined with other entertainment channels, constituting a downstream bandwidth, e.g., 50–550 MHz, in downstream channel combiner 335.

Figure 4:
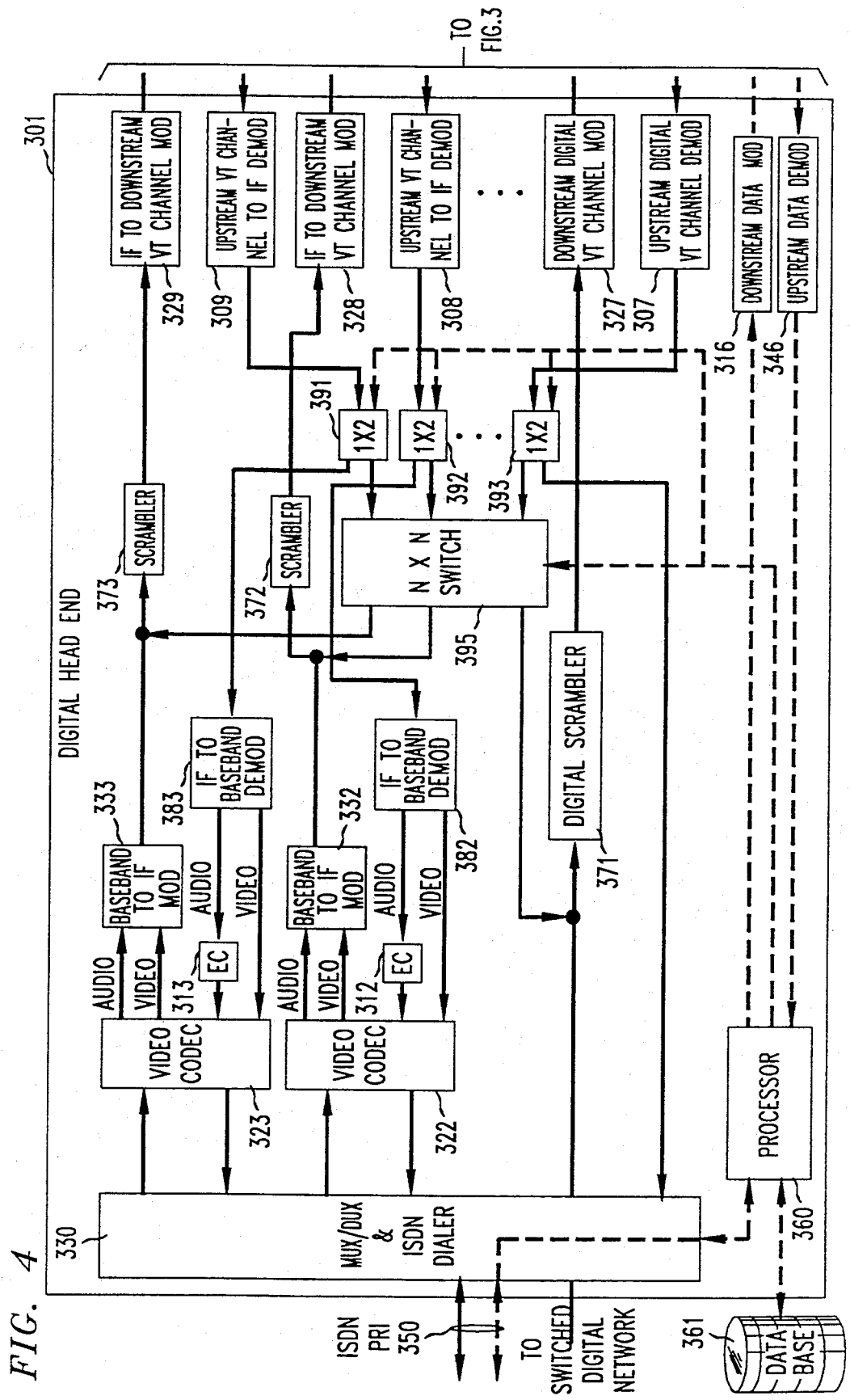
FIG. 4 illustrates, in block diagram form, a typical arrangement for a digital head end such as head end 108 or 138 or FIG. 1.

FIG. 4 illustrates in block diagram form a typical arrangement for a digital head end, such as digital head ends 108 and 138 of FIG. 1, which serve as an interface between the cable distribution network and a digital transmission facility such as a T1 or T3 transmission facility operating with the ISDN PRI protocol. In the digital head end, upstream analog video telephone channels (two channels being illustrated in FIG. 4) terminate on upstream analog video telephone channel to IF demodulators 308 and 309, while an upstream digital video telephone channel (one channel being illustrated in FIG. 4) terminates on upstream digital video telephone channel demodulator 307.

The output from each upstream video telephone channel demodulator 307–309 feeds into a respective 1×2 switch 391–393. There are two outputs of each of those 1×2 switches. One goes to an input port of an N×N switch 395, where N is the sum of the total number of analog and digital video telephone channels. The second output from switches 391 and 392 goes to the IF to baseband demodulator 382 and 383, while the second output from switch 393 goes directly to MUX 330. This different treatment results from the fact that the output of demodulator :307 is digital, and thus does not require IF to baseband demodulation and digital coding, as do the outputs from demodulators 308 and 309, which are analog.

Both 1×2 switches 391–393 and N×N switch 395 receive control instructions from processor 360 which distinguish inter-cable video telephone calls and intra-cable video telephone calls. If, for example, the upstream analog video telephone signal demodulated by demodulator 309 is to be transported to a remote location in another cable distribution system, 1×2 switch 391 will connect its input to IF to baseband demodulator 383. If, in the other case, the upstream analog video telephone signal demodulated by demodulator 309 is to be transmitted to a destination location in the same cable distribution system (intra-cable video telephone call) via one of the analog downstream video telephone channels, 1×2 switch 391 will connect its input to N×N switch 395. The function of the N×N switch is to connect such an upstream analog video telephone signal directly to one of the downstream analog video telephone channels. For this purpose, the outputs of N×N switch 395 are connected to IF to downstream video telephone channel modulators 328 and 329, via scramblers 372 and 373, which are used so that only the intended destination location can recover and use the transmitted audio/video signals.

With respect to digital (as opposed to analog) signals received in the digital head end of FIG. 4, processing of the upstream digital video telephone signal demodulated by demodulator 307 also depends on whether the destination location is connected to the same cable distribution network as the originating location (i.e. an intra-cable system call) or to a different cable distribution network (i.e. an inter-cable system call). If the call is destined for a destination location in another cable distribution system, 1×2 switch 393 connects its input to MUX 330. If, in the other case, the upstream digital video telephone signal demodulated by demodulator 307 is to be transmitted to a destination location in the same cable distribution system via one of the downstream digital video telephone channels, 1×2 switch 393 connects its input to N×N switch 395. As before, the function of N×N switch 395 is to connect the upstream digital video telephone signal to one of the downstream digital video telephone channels. For security purposes, the downstream digital video telephone signal is scrambled in digital scrambler 371 before being applied to downstream digital video telephone channel modulator 327.

The baseband audio and video signals output from IF to baseband demodulators 382–383 are essentially similar to the original analog audio and video signals generated in the originating location. However, due to the fact that incoming audio played from the TV set may be picked up by the microphone of the camcorder, echo cancelers 312–313 may be arranged to eliminate echo in the audio signals, in a manner well-known to those skilled in the art. In order to convert the audio and video signals to digital form, the video outputs of demodulators 382–383 and the audio outputs from echo cancelers 312–313 are applied to a plurality of codecs 322–323, which illustratively provide a digital output at 384 Kb/s. Many codecs of this kind are commercially available such as those that are marketed by Compression Labs, Model Rembrandt II/VP. The outputs of codecs 322–323 and the digital video telephone signals from the upstream digital video telephone channels are combined in a time division multiplexer 330 having ISDN PRI protocol capability. The output of multiplexer 330 is applied via digital transmission facility 350 to switched digital network 103.

In the reverse direction, multiplexed composite signals from digital network 103 are received in the head end of FIG. 4 via digital transmission facility 350. Individual digital signals destined for different terminating locations are recovered by demultiplexing in time division multiplexer 330, which performs the demultiplexing function in a manner complementary to the multiplexing function performed on upstream signals, according to the video telephone channel assignment messages generated by VCC 180. The demultiplexed bit streams from multiplexer 330 are applied to codecs 322–323 or directly to digital scrambler 371 if the bit streams are destined for locations with video decoding equipment. Note that the matching of bit streams to particular downstream channels is controlled by VCC 180 during call setup, when specific downstream and upstream channels are assigned in both the originating and terminating coaxial networks.

The digital signals applied to codecs 322–323 are first decompressed and then converted back into individual baseband audio and video signals. These baseband outputs are modulated to IF in baseband to IF modulators 332–333 and then scrambled in scramblers 372–373, and the scrambled IF signal is then frequency modulated in modulators 328–329. As stated previously, modulators 328–329 have different carrier frequencies corresponding to the downstream analog channels on the cable distribution network that are allocated for video telephone calls. The outputs of modulators 327–329 in the downstream bandwidth (e.g. 50–500 MHz) are combined in downstream channel combiner 335 in analog head end 300 and applied to cable 302.

If a demultiplexed digital (rather than analog) signal is destined for a location equipped with video decoding equipment, such a signal need not be converted back to analog form via a codec in the head end. Rather, such a signal is first scrambled by digital scrambler 371 and then modulated to an assigned downstream digital video telephone channel via downstream digital video telephone channel modulator 327.

Because video telephone signals in all downstream channels are applied to all NIUs connected to the cable distribution network 302, the analog scrambling provided in scramblers 372-373 and the digital scrambling provided in scrambler 371 is necessary for privacy reasons. This assures that the audio/video information can only be used by the particular user for which it is destined because only that user can descramble the signal. For this purpose, only an addressed NIU will receive the descrambling code. An analog NIU will activate its respective analog descrambler 230 and a digital NIU will activate its respective digital descrambler 250 in order to reassemble the received analog or digital audio/video information.

Part of the upstream bandwidth that is split out of the signal received by splitter 305 in the analog head end is a control signal in an upstream data communication channel which is demodulated in an upstream data communication channel demodulator 306 in the digital head end. The retrieved upstream control signal is fed into processor 360, and then combined in multiplexor 330 with digitized video telephone signals before being transmitted to digital network 103 via transmission facility 350. The functions of processor 360 are (1) to communicate with VCC 180 to exchange control messages; (2) to perform polling; (3) to control the N×N switch 395, and the 1×2 switches 391-393; and (4) to control the multiplexor/demultiplexor 330. Local database 361, which operates with processor 360, contains the address and type of all of the NIUs connected by the cable network, and the video telephone channel status. This information is used for polling the NIUs. Downstream data messages from digital network 103 are demultiplexed in multiplexor/demultiplexor 330, and fed into processor 360. These messages, which are used to control subscriber NIUs, are modulated in the downstream data communications channel by modulator 326, and combined with other downstream video telephone channels in downstream channel combinet 335.

Filter 340, together with splitter 305 and combinet 335 operate on analog signals. The distance between the splitter 305 (or combiner 335), and demodulators 307-309, (or modulators 327-329) which are part of the digital head end 301, may vary from a few feet to many miles. In the former case, coaxial cables can be used for the connections, while in the latter case, existing off-the-shelf analog fiber optic or microwave transmitters and receivers can be used. While FIG. 3 and FIG. 4 illustrate two analog video telephone channels and one digital video telephone channel, it is to be understood that fewer or more video telephone channels may exist on cable 302, and accordingly, a different number of demodulators and modulators may be employed.

Figure 5:
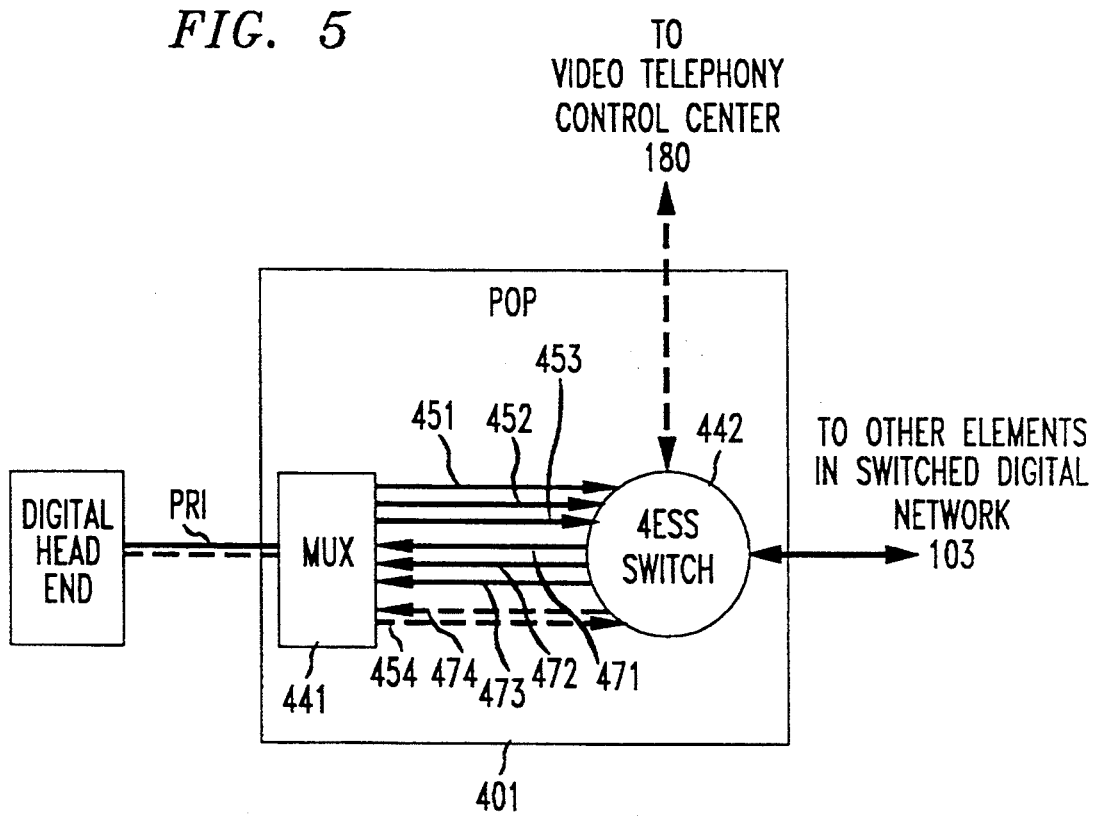
FIG. 5 is a block diagram illustrating the arrangement of point of presence (POP) equipment 104 and 134 of FIG. 1 in more detail.

Referring now to FIG. 5, there is shown a block diagram illustrating the arrangement of point of presence (POP) equipment 104 and 134 of FIG. 1 in more detail. Each POP including POPs 104 and 134 shown in FIG. 1, as well as additional POPs such as POP 401, which are inter-connected within switched digital network, includes a multiplexer/demultiplexer 441 and an inter-connected digital switch 442 such as an AT&T 4ESS digital switch. Upstream signals typically in the PRI Q931 protocol, are received in the POP from a digital head end and applied to multiplexer/demultiplexer 441. These signals, which include several, illustratively three in FIG. 5, video telephone information signals as well as signaling information, are demultiplexed in multiplexer/demultiplexer 441 to yield individual outputs on lines 451-453, which have the same bit rate, illustratively 384 Kb/s, as the signals multiplexed within the digital head end multiplex/demultiplex 330 in FIG. 4. These outputs are applied to individual ports of switch 442 for routing to the appropriate destination within digital network 103. Upstream control signals applied to multiplexer/demultiplexer 441 are separately recovered on line 454 and routed through switch 442 to VCC 180. Signaling messages may be transmitted between switch 442 and VCC 180 using the CCS7 signaling network, which interconnects all switches within network 103.

If POP 401 in FIG. 5 is the destination for video telephone information signals, switch 442 receives signaling information from VCC 180 indicating the ultimate destination for the call, analog or digital video telephone channel assignments, descrambling codes, etc. The incoming video telephone information signal received in switch 442 is coupled to a particular one of lines 471-473, which also connect switch 442 to multiplexer/demultiplexer 441, while the control messages are also passed on a separate line 474. In multiplexer/demultiplexer 441 the individual video telephone information signals from various sources are combined with each other and with control messages relating thereto, and transmitted to the digital head end, again typically using PRI Q931 protocol.

Referring now to FIG. 6, there is shown a flow diagram illustrating the process followed in video telephone control center 180 of FIG. 1 in setting up a video telephone call. When VCC 180 receives a request to set up or initiate a call in step 501, a query is initiated to database 185 in step 503 in order to determine identification information for the head ends of the calling and called parties and the types and descrambling codes associated with the NIUs in the originating and destination locations. All of the foregoing information is available based on: (1) called party identification information provided by the caller via dialing pad 272, and (2) calling party identification information output from microprocessor 270 within the originating NIU. In step 505, VCC checks the availability of the right types of both upstream and downstream video telephone channels in the cable distribution networks serving the originating and destination locations. If it is determined in step 510 that either or both channels are not available, VCC 180 is arranged to send a busy message to the originating head end in step 511. This message is used in the originating head end to signal the caller's NIU to provide a busy tone or other suitable message. The processing sequence is then terminated in step 513.

If both video telephone channels are determined to be available in step 510, the channel availability information contained in database 185 is updated in step 521, so that subsequent queries will reflect the current status of the video telephone channels in the cable distribution networks. In addition, the originating head end is instructed to initiate a switched digital connection to the destination head end via switched digital network 103.

In step 523, VCC 180 transmits upstream and downstream channel assignments and descrambling codes to both the originating and destination head ends. These messages are also used, as described previously, to control the NIUs in the originating and destination locations and thereby enable video telephone communication using the correct channels and descrambling codes. Digital head ends 108 and 138 monitor their upstream data communication channels in step 525 to await the receipt of an on-hook message, which may be generated by the NIU in either the originating or destination location. Upon receipt of such on-hook message the head end transmits a termination message to its POP to tear down the connection between the originating and destination head ends in step 527, thereby ending the video telephone call. At the same time, the head end also sends a termination message to VCC 180 in order to update database 185, so that the video telephone channels used during the preceding call may be reassigned to another call.

Various modifications and adaptations may be made to the present invention. For this reason, it is intended that the invention be limited only by the following claims. For example, although the preceding description indicates that VCC 180 and its associated database 185 serve as a centralized storage location for availability information relating to video telephone channels in all of the cable distribution networks, it is to be understood by those skilled in the art that a distributed database arrangement could also be used. In such a distributed arrangement, each originating head end would monitor and store information relating to the availability of channels on its own cable distribution network, and then query the head end of the remote cable distribution network during the process of call initiation, in order to determine the availability of upstream and downstream video telephone channels on the remote network. It is also to be noted that while the preceding description utilized dedicated bandwidth for each video telephone channel, various well-known multiplexing schemes (e.g., TDMA) can be used to further share that bandwidth among several users simultaneously. This type of sharing supplements the sharing achieved by assigning available channels to users only for the duration of a video telephone call.

I claim:

1. A system for making a video telephone call by transmitting a video telephone signal from an originating location to a destination location via first and second cable distribution networks, said first cable network having an associated originating side head end and said second cable network having an associated destination side head end, said system comprising means in said origination location for transmitting a first modulated signal generated by modulating a carrier having a first associated carrier frequency with said video telephone signal generated at said originating location, to said originating side head end via said first cable distribution network, said first carrier frequency corresponding to the frequency of an available upstream video telephone communication channel on said first cable distribution network, means for transmitting said video telephone signal from said originating side head end to said destination side head end connected to said second cable distribution network, means in said destination side head end responsive to said last mentioned means for transmitting a second modulated signal generated by modulating a carrier having a second associated carrier frequency with said video telephone signal, to said destination location, said second carrier frequency corresponding to the frequency of an available downstream video telephone communication channel on said second cable distribution network, and means in said destination location for recovering said video information generated at said originating location, wherein said system further includes means for assigning available ones of said upstream and downstream video telephone communication channels only for the duration of said video telephone call.

2. The invention defined in claim 1 wherein said destination side head end includes means for scrambling said video telephone signal to form a scrambled second modulated signal, and wherein said system further includes means in said destination location for descrambling said scrambled second modulated signal.

3. The invention defined in claim 1 wherein said video telephone signal transmitting means includes a digital switch.

4. The invention defined in claim 3 wherein said system further includes means in said originating side head end for converting said video telephone signal recovered from said first modulated signal to a digital signal applied to said digital switch, and means in said destination side head end for convening a corresponding digital signal received from said digital switch to said video telephone signal used to modulate said second carrier signal.

5. The invention defined in claim 4 wherein said system further includes means in said originating side head end for multiplexing said digital signal applied to said digital switch with other signals, and means in said destination side head end for demultiplexing a composite digital signal to recover said corresponding digital signal.

6. The invention defined in claim 1 wherein said video telephone signal transmitting means includes an analog switch.

7. The invention defined in claim 1 wherein said system further includes at least one database for storing information describing the availability of each said video telephone communication channel in said cable distribution network.

8. The invention defined in claim 1 wherein said originating and terminating head ends include means for detecting the completion of a call, and means responsive to said detecting means for relinquishing each said video telephone communications channel for use by other users.

9. The invention defined in claim 1, wherein said originating side head end further includes a plurality of codecs arranged to perform analog/digital conversion of signals applied thereto.

10. The invention defined in claim 1, wherein each of said originating and destination locations includes a network interface unit adapted to combine audio and video signals generated at said locations with control signals processed in a microprocessor.

11. Apparatus for transmitting audio and video information from a first location to a second, remote location, using cable distribution networks, said apparatus comprising a video camera for generating an audio and video signal;

means for modulating a first carrier signal with said audio and video signal and a control signal indicative of the address of said remote location, to generate a first modulated signal;

means for transmitting said first modulated signal via a portion of a first cable distribution network to an originating side head end;

means for demodulating said first modulated signal to retrieve said audio and video signal;

means for converting said retrieved audio and video signal to digital signals;

means for transmitting said digital signals to a destination side head end, said destination side head end being selected in accordance with said control signal;

means responsive to said last mentioned means for converting said digital signals to said audio and video signal at said destination side head end;

means for modulating a second carrier signal with said audio and video signal recovered from said digital signals to generate a second modulated signal;

means for transmitting said second modulated signal via a portion of a second cable distribution network to said remote location; and means for demodulating said second modulated signal to recover said audio and video signal.

12. The invention defined in claim 11 wherein said apparatus further includes means for selecting said first and second carrier signals in accordance with available channels on said first and second cable distribution networks, said channels being selected on a contention basis.

13. The invention defined in claim 11 wherein said apparatus further includes means for scrambling said second modulated signal.

14. A system for completing a video telephone call to a destination location via a coaxial cable distribution network and a switched digital telecommunications network, said system comprising a source of audio and video signals activated by placing said video telephone call, a network interface unit (NIU) for applying said audio and video signals to an available video telephone communication channel on said cable distribution network, said particular channel being selected under the control of a microprocessor in said NIU;

means including a head end for converting received audio and video signals in said available video telephone communication channel to a digital signal;

means for transmitting said digital signal as well as routing information indicative of said destination location to said switched digital telecommunications network; and means in said switched digital telecommunications network for routing said call to said destination location in response to said routing information, wherein said particular video telephone communication channel is assigned to only for the duration of said video telephone call.

15. A system for enabling two way video telephone communication between an originating location and a destination location, comprising switch means, first means in said originating location for (a) transmitting video telephone signals originating therein to said switch means via a first available channel on a first multichannel cable distribution network, and (b) receiving video telephone signals originating in said destination location and transmitted thereto from said switch means via a second available channel on said first multichannel cable distribution network, wherein others ones of the channels on said first cable distribution network are used for other communications, second means in said destination location for (a) transmitting video telephone signals originating therein to said switch means via a first available channel on a second multichannel cable distribution network, and (b) receiving video telephone signals originating in said origination location and transmitted thereto from said switch means via a second available channel on said second multichannel cable distribution network, wherein other ones of the channels on said second cable distribution network are used for other communications, wherein said switch means is arranged to route calls from said first means to said second means, and vice versa.

16. The invention defined in claim 15 wherein said first and second means further include means for analog to digital conversion, and wherein said switch means is a digital switch.

17. The invention defined in claim 15 wherein said system further includes means for storing availability information with respect to said channels on said cable distribution networks, and wherein said switch means is an analog switch responsive to an output from said storing means.

18. A method for making a video telephone call by transmitting video telephone signals from an originating location to a destination location via first and second cable distribution networks, said first cable distribution network having an associated originating side head end and said second cable distribution network having an associated destination side head end, said method comprising the steps of transmitting a first modulated signal generated by modulating a carrier having a first associated carrier frequency with video telephone signals generated at said originating location, from said originating location to said originating side head end via said first cable distribution network, said first carrier frequency corresponding to the frequency of an available upstream video telephone communication channel on said first cable distribution network, transmitting said video telephone signals from said originating side head end to said destination side head end connected to said second cable distribution network, means in said distribution side head end responsive to said last mentioned means for transmitting a second modulated signal generated by modulating a carrier having a second associated carrier frequency with said video telephone signals, from said destination side head end to said destination location, said second carrier frequency corresponding to the frequency of an available downstream video telephone communication channel on said second cable distribution network, and recovering in said destination location said video information generated at said originating location, wherein said method further includes the step of assigning available ones of said upstream and downstream video telephone communication channels only for the duration of said video telephone call.

19. The method defined in claim 18 further including the steps of scrambling in said destination side head end said video telephone signals to generate a scrambled second modulated signal, and descrambling in said destination location said scrambled second modulated signal.

20. The method defined in claim 18 wherein said video telephone signal transmitting step includes transmitting said video telephone signals via a digital switch.

21. The method defined in claim 20 wherein said method further includes the steps of converting video telephone signals recovered from said first modulated signal in said originating side head end to digital signals, applying said digital signals to said digital switch, and converting corresponding digital signals received from said digital switch in said destination side head end to said video telephone signals used to modulate said second carrier signal.

22. The method defined in claim 21 wherein said method further includes the steps of multiplexing said digital signals applied to said digital switch with other signals in said originating side head end, demultiplexing composite digital signals in said destination side head end to recover said corresponding digital signals.

23. The method defined in claim 18 wherein said video telephone signal transmitting step includes transmitting said signals via an analog switch.

24. The method defined in claim 18 wherein said method further includes the steps of storing information describing the availability of said video telephone communication channels in said cable distribution network in at least one database.

25. The method defined in claim 18 wherein said method further includes the steps of detecting the completion of a call in said originating and terminating head ends, and relinquishing said video telephone communication channels for use by other users, in response to said detecting step.

26. The method defined in claim 18 wherein said method further includes performing analog/digital conversion of signals applied to said originating side head end in one of a plurality of codecs.

27. The method defined in claim 18, wherein said method further includes combining audio and video signals generated at said originating and destination locations with control signals processed in a microprocessor in a network interface unit in each of said originating and destination locations.

28. A method for transmitting audio and video information from a first location to a second, remote location, comprising the steps of generating audio and video signals in a video camera, modulating a first carrier signal with said audio and video signals and a control signal indicative of the address of said remote location, to generate first modulated signals;

transmitting said first modulated signals via a portion of a first cable distribution network to an originating side head end;

demodulating said first modulated signals to retrieve said audio and video signals;

converting said retrieved audio and video signals to digital signals;

transmitting said digital signals to a destination side head end selected in accordance with said control signal;

receiving said digital signals in said destination side head end;

converting said digital signals to said audio and video signals at said destination side head end;

modulating second carrier signals with said audio and video signals to generate second modulated signals;

transmitting said second modulated signals via a portion of a second cable distribution network to said remote location; and demodulating said second modulated signals to recover said audio and video signals.

29. A method for completing a video telephone call to a destination location via a coaxial cable distribution network and a switched digital telecommunications network, said method comprising the steps of generating audio and video signals by placing said video telephone call, applying said audio and video signals to an available video telephone communication channel on said cable distribution network, said particular channel being selected under the control of a microprocessor in a network interface unit (NIU), converting said audio and video signals received in a head end via said available video telephone communication channel to digital signals;

transmitting said digital signals as well as routing information indicative of said destination location to said switched digital telecommunications network; and routing said call to said destination location via said switched digital telecommunications network in response to said routing information, wherein said particular video telephone communication channel is assigned to only for the duration of said video telephone call.

30. A method for enabling two way video telephone communication between an originating location and a destination location via a switch, comprising the steps of (a) transmitting video telephone signals originating in said originating location to said switch via a first available upstream channel on a first multichannel cable distribution network, (b) receiving video telephone signals originating in said destination location and transmitted to said originating location from said switch via a second available downstream channel on said first multichannel cable distribution network, wherein others ones of the channels on said first cable distribution network are used for other communications, (c) transmitting video telephone signals originating in said destination location to said switch via a first available upstream channel on a second multichannel cable distribution network, and (d) receiving video telephone signals originating in said origination location and transmitted to said destination location from said switch via a second available downstream channel on said second multichannel cable distribution network, wherein others ones of the channels on said second cable distribution network are used for other communications, wherein said method further includes (e) connecting video telephone signals between transmitted in said first available upstream channel on said first cable distribution network to said second available channel on said second cable distribution network via said switch, and (f) connecting video telephone signals transmitted in said first available upstream channel on said second cable distribution network to said second available channel on said first cable distribution network via said switch.

31. The method defined in claim 30 wherein said method further includes the steps of storing in a database, availability information with respect to said channels on said cable distribution networks, and performing said switching step responsive to said storing step.

32. A method for transmitting audio and video information for a video telephone call from an origination location to a switch via a coaxial cable distribution network, including the steps of generating audio and video information signals, modulating said audio and video information signals in a network interface unit connected to said distribution network to a carrier frequency corresponding to an available channel on said coaxial cable distribution network, recovering said audio and video information signals in a head end connected to said cable distribution network, and applying said recovered signal to said switch, wherein said method further includes the steps of monitoring for the existence of an available channel on said distribution network and providing a control signal to said network interface unit identifying said available channel.

33. The method defined in claim 32 wherein said monitoring step includes storing information specifying said available channel and updating said stored information upon completion of said video telephone call.

34. A system for transmitting audio and video information for a video telephone call from an origination location to a switch via a coaxial cable distribution network, including a source of audio and video information signals, a network interface unit connected to said distribution network for modulating said audio and video information to a carrier frequency corresponding to an available channel on said coaxial cable distribution network, and a head end connected to said cable distribution network for recovering said audio and video information signals and for applying said recovered audio and video information signals to said switch, wherein said system further includes means for monitoring for the existence of an available channel on said distribution network and for providing a control signal to said network interface unit identifying said available channel.

35. The system defined in claim 34 wherein said monitoring means is arranged to store information specifying said available channel and to update said stored information upon completion of said video telephone call.

36. A network interface unit (NIU) for interfacing between video telephony audio/video originating and terminating devices, and a cable distribution network, said NIU including means for modulating audio/video signals generated in said originating device with a carrier signal to generate an upstream modulated signal which is applied to an available video telephone channel on said cable distribution network, means for demodulating a downstream modulated signal applied to said NIU from said cable distribution network to retrieve audio/video signals to be applied to said terminating device, and processor means for controlling the selection of the frequency of said carrier signal in response to a received signal indicating the availability of video telephone channels on said cable distribution network.

37. The invention defined in claim 36 wherein said control signal is received in said NIU via said cable distribution network.

38. The invention defined in claim 36 wherein said audio/video signals used to generate said upstream modulated signal and said retrieved audio/video signals, are digital signals.

39. The invention defined in claim 36 wherein said NIU further includes means for converting said audio/video signals used to generate said upstream modulated signal from analog to digital form.

40. The invention defined in claim 36 wherein said NIU further includes means for converting said retrieved audio/video signals from digital to analog form.

41. Apparatus for transmitting audio and video information from a first location to a second, remote location, using cable distribution networks, said apparatus comprising means including a video coder for generating a digital representation of audio and video signals;

means for modulating a first carrier signal with said digital representation of said audio and video signals and a control signal indicative of the address of said remote location, to generate first modulated signals;

means for transmitting said first modulated signals via a portion of a first cable distribution network to an originating side head end;

means for demodulating said first modulated signals to recover said digital representation of said audio and video signals;

means for transmitting said digital representation of said audio and video signals to a destination side head end, said destination side head end being selected in accordance with said control signal;

means in said destination side head end responsive to said last mentioned means and including means for modulating a second carrier signal with said digital representation of said audio and video signals, to generate second modulated signals;

means for transmitting said second modulated signals via a portion of a second cable distribution network to said remote location; and means for demodulating said second modulated signals to recover said digital representation of said audio and video signals.

42. The invention defined in claim 41 wherein said apparatus further includes means for selecting said first and second carrier signals in accordance with available channels on said first and second cable distribution networks, said channels being selected on a contention basis.

43. A system for completing a video telephone call to a destination location via a coaxial cable distribution network and a switched digital telecommunications network, said system comprising a source of audio and video signals activated by placing said video telephone call, said audio and video signals being in digital form;

a network interface unit (NIU) for applying said audio and video signals in digital form to an available video telephone communication channel on said cable distribution network, said particular channel being selected under the control of a microprocessor in said NIU;

means including a head end for combining said audio and video signals received in said available video telephone communication channel with routing information indicative of said destination location and for transmitting said combined signal to said switched digital telecommunications network; and means in said switched digital telecommunications network for routing said call to said destination location in response to said routing information, wherein said particular video telephone communication channel is assigned to only for the duration of said video telephone call.

44. A system for making a video telephone call by transmitting video telephone signals from an originating location to a destination location via first and second cable distribution networks, said first cable network having an associated originating side head end and said second cable network having an associated destination side head end, said system comprising means in said origination location for transmitting a first digital signal representing audio and video information generated in said originating location to said originating side head end via an available upstream video telephone communication channel on said first cable distribution network, means for transmitting said first digital signal from said originating side head end to said destination side head end, via a switched communications network;

means in said destination side head end for receiving said first digital signal from said last mentioned means and for transmitting a second digital signal representing a scrambled version of said audio and video information to said destination location via an available downstream video telephone communication channel on said second cable distribution network, and means in said destination location for recovering said audio and video information generated at said originating location.

* * * * *

UNITED STATES PATENT AND TRADEMARK OFFICE
CERTIFICATE OF CORRECTION

PATENT NO. : 5,643,240
DATED : July 1, 1997
INVENTOR(S) : Jackson et al.

It is certified that error appears in the above-identified patent and that said Letters Patent is hereby corrected as shown below:

Title page, item [73], "Neenan" should read --Neenah--;
Column 5, line 27, "units or units or aspirators" should read --units or aspirators--;
Column 8, line 66, "layer was" should read --layer which was--;
Column 9, line 35, "(2.8 mm)" should read --(0.28 mm)--.

Signed and Sealed this

Ninth Day of June, 1998

Attest:

BRUCE LEHMAN

Attesting Officer

Commissioner of Patents and Trademarks